United States Patent
Jacolin et al.

(10) Patent No.: US 11,239,653 B2
(45) Date of Patent: Feb. 1, 2022

(54) MEASURING DEVICE AND ELECTRICAL SWITCHING UNIT

(71) Applicant: Schneider Electric Industries SAS, Rueil Malmaison (FR)

(72) Inventors: Brice Jacolin, Vinay (FR); Michael Mary, Saint Martin d'Heres (FR); Eric Pinero, Seyssinet (FR); Nicolas Dormigny, Rotherens (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 307 days.

(21) Appl. No.: 16/590,847

(22) Filed: Oct. 2, 2019

(65) Prior Publication Data

US 2020/0119545 A1 Apr. 16, 2020

(30) Foreign Application Priority Data

Oct. 15, 2018 (FR) ...................................... 18 59515

(51) Int. Cl.
| | |
|---|---|
| H02H 7/22 | (2006.01) |
| H01H 9/26 | (2006.01) |
| H02H 7/085 | (2006.01) |

(52) U.S. Cl.
CPC .............. H02H 7/222 (2013.01); H01H 9/26 (2013.01); H02H 7/0851 (2013.01)

(58) Field of Classification Search
CPC ......... H02H 7/222; H02H 7/0851; H01H 9/26
See application file for complete search history.

(56) References Cited

U.S. PATENT DOCUMENTS

| | | | | |
|---|---|---|---|---|
| 5,828,323 A | * | 10/1998 | Bartet .................. | G06F 3/0235 341/22 |
| 6,377,431 B1 | | 4/2002 | Jones et al. | |
| 7,064,635 B2 | * | 6/2006 | Bogdon ............ | H01H 71/1009 335/17 |
| 7,868,262 B2 | * | 1/2011 | Whitaker ........... | H01H 71/0228 200/293 |
| 7,985,936 B2 | * | 7/2011 | Ahn ....................... | H01H 71/04 200/308 |
| 8,686,815 B2 | * | 4/2014 | Sohn ..................... | H01H 71/46 335/17 |

FOREIGN PATENT DOCUMENTS

| | | |
|---|---|---|
| EP | 0 872 867 A2 | 10/1998 |
| EP | 1 744 428 A2 | 1/2007 |
| WO | WO 01/13488 A1 | 2/2001 |

OTHER PUBLICATIONS

French Preliminary Search Report dated May 24, 2019 in French Application 18 59515, filed on Oct. 15, 2018 (with English Translation of Categories of Cited Documents & Written Opinion).

* cited by examiner

*Primary Examiner* — Scott Bauer
(74) *Attorney, Agent, or Firm* — Oblon, McClelland, Maier & Neustadt, L.L.P.

(57) ABSTRACT

A device having an armature including a main wall; a rotary part intended to be mechanically coupled to a control shaft of an electrical switching unit; a bar integral with the rotary part and able to rotate between a first position and a second position and extending through a slot in the main wall; a position sensor having a movable contact pushed into a retracted position by the bar when the bar is in the first position; a stabilizing device having a resilient strip extending along the slot in order to exert a retaining force on the bar when it is in the first position.

12 Claims, 4 Drawing Sheets

MEASURING DEVICE AND ELECTRICAL SWITCHING UNIT

The present invention relates to a measuring device for detecting the state of an electrical switching unit. The invention also relates to an electrical switching unit having such a measuring device.

Electrical switching and protection devices, such as circuit breakers, are generally configured to interrupt the flow of an electric current when the intensity of the current exceeds a trip threshold. Some trip thresholds are adjustable by the user, who can thus adapt the trip curve of the unit according to the circumstances. As examples of adjustable thresholds, the trip thresholds known as long delay and short delay trip thresholds, which correspond to overload currents and short-circuit currents, respectively may be cited.

In some applications, it is additionally desirable to use a self-protection threshold, in order to ensure the protection of the unit when the short-circuit current "$I_{cc}$" is greater than a maximum electrodynamic withstand limit that is able to be supported by the unit.

This is particularly useful in the case of protection and switching units used in low-voltage and high-intensity electrical distribution installations. In many examples, such a unit is positioned upstream of secondary protection units. When a short circuit arises, the unit has to remain closed long enough for one of the secondary protection units situated downstream to be able to trip and isolate the part of the installation in which the short circuit has occurred, as long as the short-circuit current does not exceed the self-protection threshold.

In practice, the maximum electrodynamic resistance that is able to be supported by the unit is not the same when the unit is in the open state and when it is in closed state. The self-protection threshold therefore has to be adapted automatically depending on the state of the unit. It is therefore necessary to be able to safely and reliably determine whether the unit is in an open or closed state.

To this end, the invention relates to a measuring device for detecting the state of an electrical switching unit, this measuring device being characterized in that it has:
- an armature comprising a main wall;
- a rotary part intended to be mechanically coupled to a control shaft of an electrical switching unit;
- a bar that is able to rotate, integrally with the rotary part, between a first position and a second position, the bar extending through a slot formed in the main wall;
- a position sensor having a movable contact designed to be pushed into a retracted position by the bar when the bar is in the first position and into a released position when the bar is in the second position;
- a stabilizing device having a base integral with the armature and a resilient strip fastened to the base, the strip extending along the slot and being designed to exert a retaining force on the bar when it is in the first position.

By virtue of the invention, the measuring device makes it possible to safely and reliably determine whether the switching unit is in an open or closed state. In particular, the stabilizing device makes it possible to limit unintentional vibrations of the bar that are likely to result in an erroneous detection of the state of the unit.

According to advantageous but non-obligatory aspects of the invention, such a measuring device can include one or more of the following features, on their own or in any technically feasible combination:

The strip has a curved portion that is disposed next to the slot and forms a space for retaining the bar when the bar is in the first position.

The base is made of polycarbonate.

The base has a receiving housing inside which a portion of the strip is received, the housing being open onto a first face of the base that faces the main wall of the armature, the strip being anchored by means of bearing points protruding into the housing from the base.

The embedded end of the strip has a bent portion.

The base has an overthickness formed next to the receiving housing on a second face of the base on the opposite side from the first face.

The base has an electrically insulating protective wall protruding from the base perpendicularly to the main wall of the armature.

The position sensor is mounted on the armature in a manner aligned with the base of the stabilizing device, the base being interposed between the position sensor and the main wall.

The strip has a free end portion that is disposed next to the slot and bears against the bar when the bar is in the second position.

The strip is kept in contact with the bar when the bar moves between the first position and the second position.

The strip is designed to exert a retaining force on the bar when the bar is in the second position.

According to another aspect, the invention relates to an electrical switching unit having separable electrical contacts, the unit having a control shaft coupled to the separable electrical contacts in order to switch the unit between an electrically open state and an electrically closed state. The switching unit also has a measuring device according to one of the preceding claims, the measuring device being mechanically coupled to the control shaft in order to detect whether the unit is in the open state or in the closed state.

The invention will be understood better and further advantages thereof will become more clearly apparent in the light of the following description of an embodiment of a measuring device, which is given only by way of example and with reference to the appended drawings, in which.

Figure 1:
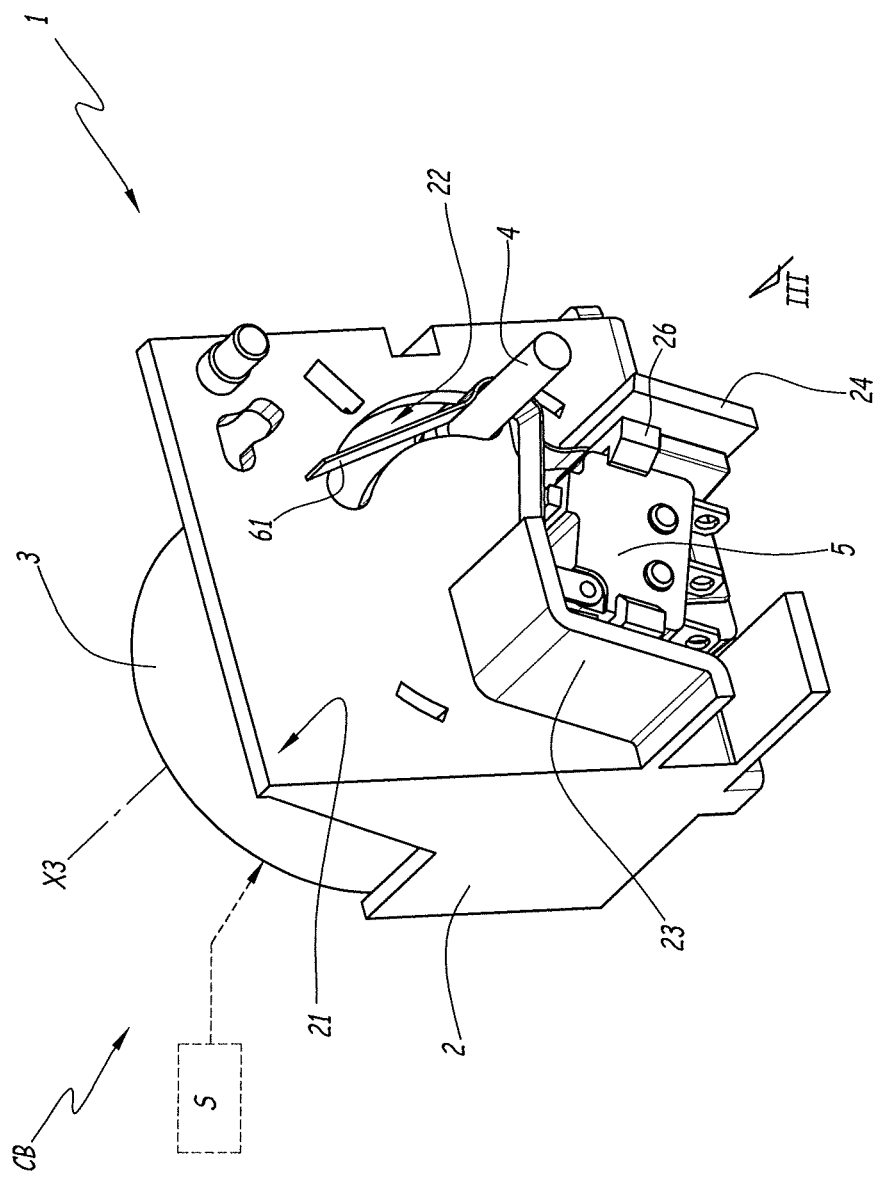
FIG. 1 is a schematic depiction, in a perspective view, of a measuring device according to embodiments of the invention, which is joined to an electrical switching and/or protection unit.

FIG. 1 refers to an electrical switching and/or protection unit, denoted CB, such as a circuit breaker, notably an air circuit breaker having separable contacts.

Depending on the implementation, the unit CB is connected to a power supply line, for example within an electrical distribution installation, such as a high-intensity (for example greater than 500 amperes) and low-voltage (for example less than 1000 volts) distribution installation. The unit CB is installed for example in an electrical switchboard.

The unit CB is switchable, selectively and reversibly, between an electrically open state, for interrupting the flow of the electric current, and an electrically closed state, in which the electric current is allowed to flow.

The unit CB is configured to interrupt the flow of electric current in the power line when the intensity of this electric current exceeds a predefined trip threshold.

To this end, the unit CB has a tripping device, not illustrated, such as an electronic tripping device.

For example, such an electronic tripping device can be implemented by, or joined to, an electronic control unit of the unit CB. In examples, the electronic control unit can have electronic circuits and/or a microcontroller or a programmable microprocessor.

The unit CB also has a switching mechanism, not illustrated, designed to move the separable contacts depending on a control command output by the tripping device, or by a control member manipulated by a user.

In examples, the unit CB can have one or more poles, each pole being associated with an electric phase of the electric current. Thus, in the case of a polyphase current, each pole has separable contacts that are inherent thereto but are nevertheless controlled jointly by the switching mechanism.

For example, the switching mechanism has a control shaft, denoted S and commonly known as "pole shaft".

The shaft S is coupled to the separable contacts in order to transmit thereto an opening or closing movement, so as to open or close the unit, for example when the shaft S moves between corresponding predefined positions. In examples, the shaft S is rotatable about its longitudinal axis and moves between the predefined positions by turning about its longitudinal axis.

The unit CB also has a measuring device 1 designed to determine the state of the unit CB, in particular to determine whether the unit CB is in an open or closed state.

An example of the measuring device 1 is illustrated in FIGS. 1 to 6.

Figure 2:
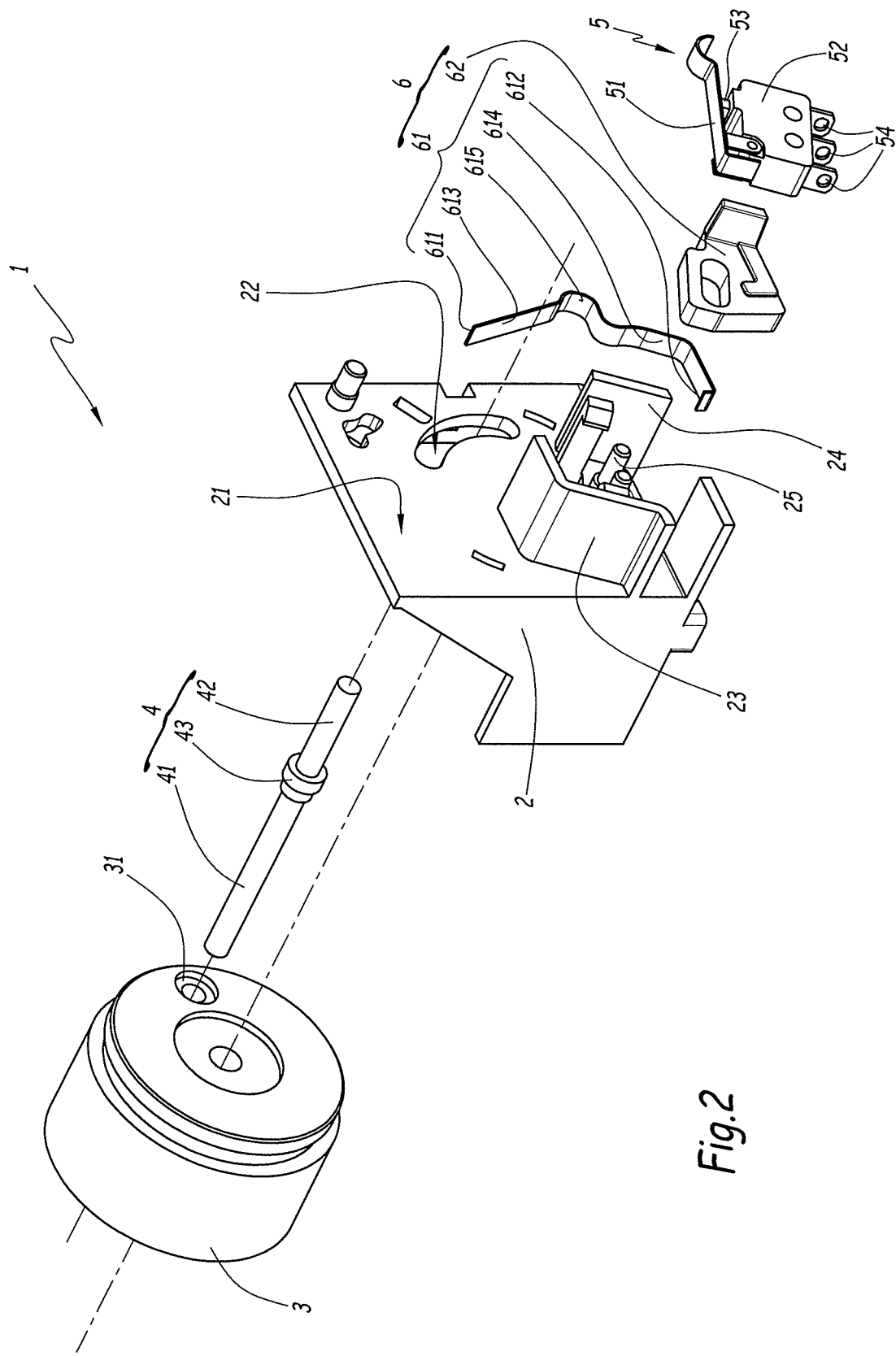
FIG. 2 is a schematic depiction of the measuring device from FIG. 1 illustrated in an exploded view.

As illustrated in FIG. 2, the device 1 has an armature 2, a rotary part 3, a bar 4, a position sensor 5 and a stabilizing device 6.

The armature 2 comprises a main wall 21, for example of flat shape. A through-slot 22 is formed in the main wall 21.

In examples, the armature 2 is made of plastics material, for example polycarbonate.

For example, the armature 2 is fastened inside a casing of the unit CB.

The part 3 is mounted on the armature 2, for example on a first face of the wall 21. The part 3 is rotatable about an axis X3 perpendicular to the wall 21. The part 3 is preferably centred on the axis X3.

In examples, the part 3 is in the form of a wheel or cylinder. For example, the diameter of the part 3 is greater than or equal to 1 cm and less than or equal to 10 cm.

The bar 4 is rotatable about the axis X3, between a first position and a second position, by rotating as one with the part 3.

In other words, since the bar 4 rotates as one with the part 3, any rotational movement of the part 3 corresponds to a rotational movement of the bar 4 about the axis X3.

The bar 4 also extends through the slot 22.

In examples, the bar 4 is off-centre with respect to the axis of rotation X3 and extends in a direction parallel to the axis X3.

For example, a part of the bar 4 is inserted into a through-housing 31, such as a drilled hole, formed in the part 3.

In the example illustrated, the bar 4 is in the form of a rod. A first part 41 of the bar 4 is at least partially inserted in the housing 31. A second part 42 of the bar 4 passes through the slot 22.

Advantageously, the bar 4 can have an intermediate element 43, in this case in the form of a ring, which acts as a stop for preventing inadvertent movement in translation of the bar 4 along its longitudinal axis once it has been inserted into the housing 31. The housing 31 may have a reamed portion, which receives the intermediate element 43.

Preferably, the bar 4 is made of metal, for example steel.

In embodiments, the device 1 also has an elastic return member, not illustrated, for returning the bar 4 into one of its first or second position. For example, the return member is a torsion spring.

Preferably, the return member is coupled to the part 3, the bar 4 then being returned indirectly by acting on the part 3.

For example, the return member returns the bar 4 to its second position.

The rotary part 3 is also coupled mechanically to the shaft S of the unit CB, for example by means of a transmission mechanism, not illustrated.

In implementation examples, the transmission mechanism couples the shaft S to the bar 4, for example via a lever. In this case, the part 41 of the bar 4 can protrude beyond the rear of the part 3.

It will thus be understood that, generally, the movement of the shaft S for opening or closing the separable contacts of the unit CB, and thus for switching the unit CB between the open or closed state, brings about a corresponding movement of the part 3 and of the bar 4.

The device 1 therefore makes it possible to indirectly determine the state of the unit CB, using the position of the shaft S, in particular the angular position of the shaft S, as a basis for determining whether the separable contacts of the unit CB are open or closed.

For example, the first position of the bar 4 corresponds to a closed state of the unit CB, and the second position of the bar 4 corresponds to an open state of the unit CB.

In embodiments, the part 3, also known as a "weight", acts as a retarder for the shaft S when the latter moves between its predefined positions. By way of illustrative and not necessarily limiting example, the part 3, on account of its shaping, in particular its shape or the position of its centre of gravity, counters inertia, which makes it possible to control the duration of the movement between the two positions such that this duration lies in a predefined range.

In the example illustrated, the slot 22 is in the form of a circular arc (or crescent) centred on the axis X3. For example, the length of the slot (that is to say the length of the circular arc) is chosen to correspond to the length of the movement path of the bar 4 between the first position and the second position.

Figure 3:
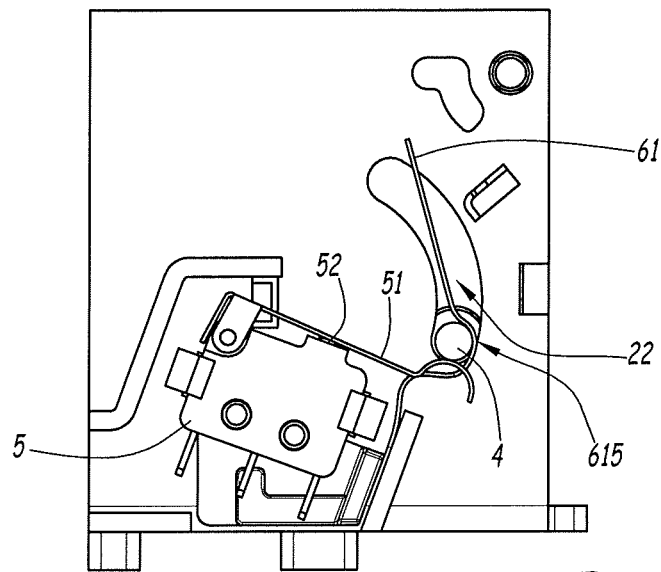
FIGS. 3 and 4 are profile views of the measuring device from FIG. 1, illustrated in the viewing direction indicated by the arrow Ill in FIG. 1 and corresponding respectively to two different positions of a bar of the measuring device.
Figure 4:
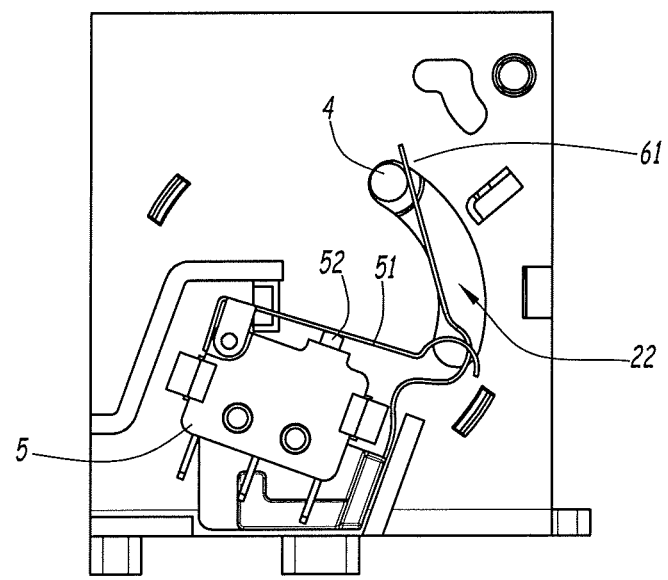

For example, in the first position, the bar 4 is in a low position, at a lower end of the slot 22, as illustrated in FIG. 3. In the second position, the bar 4 is in a high position, at an upper end of the slot 22, as illustrated in FIG. 4.

The position sensor 5 is designed to measure the position of the bar 4, notably to detect whether the bar 4 is in the first position or in the second position.

In embodiments, the position sensor 5 has a movable contact 51 designed to be pushed by the bar 4 into a depressed position when the bar 4 is in the first position, and to be released into a rest position when the bar 4 is in the second position. For example, the movable contact 51 is released as soon as the bar 4 leaves the first position.

In examples, the movable contact 51 of the sensor 5 is a strip mounted in a pivotable manner with respect to a body 52 of the sensor 5. The sensor 5 also has a push button 53, in this case incorporated into the body 52.

The strip 51 in this case has a domed end portion against which the bar 4 bears when it is in the first position.

As shown in FIGS. 3 and 4, the strip 51 bears against the button 53 only when it is depressed and does not bear against the button 53 when it is released.

The sensor 5 in this case has an electrical connector 54, for example provided with pins, for connecting the sensor 5 to a control unit of the unit CB, in order to supply a measurement signal representative of the state of the button 53, and thus representative of the depressed or released state of the movable contact 51.

Preferably, the sensor 5 is mounted on the armature 2, for example on a second face of the wall 21, this second face being on the opposite side from the first face of the wall 21.

In embodiments, the tripping device of the unit CB is programmed to automatically select a trip threshold, referred to as self-protection threshold, depending on the position of the bar 4 as detected by means of the sensor 5.

In other words, the self-protection threshold is selected automatically depending on whether the unit CB is in the open or closed state.

For example, a predefined first trip threshold, or "instantaneous self-protection trip threshold", denoted DIN, is selected automatically when the bar 4 is detected as being in the first position. A second trip threshold, or "instantaneous self-protection trip threshold upon closure", denoted DINF, is selected automatically when the bar 4 is detected as being in the second position.

The stabilizing device 6 has a strip 61 and a base 62, or casing 62. The base 62 is mounted on the armature 2. The strip 61 is fastened to the base 62, for example by being embedded in the base 62. The strip 61 extends along the slot 22 and is designed to exert a retaining force on the bar 4 when it is in one or the other of the first position and the second position.

To this end, the strip 61 is preferably resilient. For example, the strip 61 is a metal strip. In examples, the strip 61 is made of stainless steel.

By way of example, the thickness e61 of the strip 61 is less than or equal to 2 mm or less than or equal to 1.5 mm. The thickness e61 is in this case constant along the entire length of the strip 61.

In one illustrative example, the retaining force exerted on the bar 4 by the strip 61 when the bar 4 is in the first position is greater than or equal to 1 daN, preferably greater than or equal to 1.8 daN. More preferably, this force is less than or equal to 2.5 daN or, alternatively, less than or equal to 2.2 daN.

Figure 5:
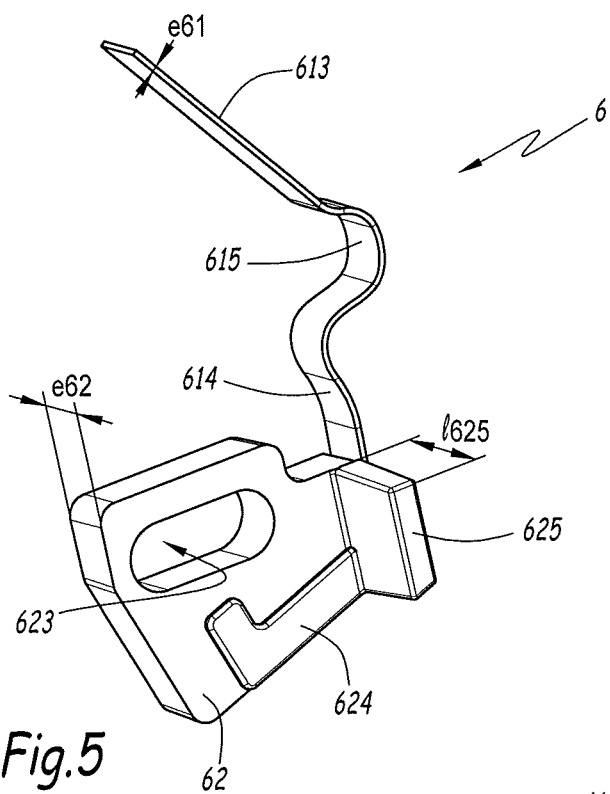
FIGS. 5 and 6 are schematic depictions, in two perspective views, of a stabilizing device belonging to the measuring device from FIG. 1.
Figure 6:
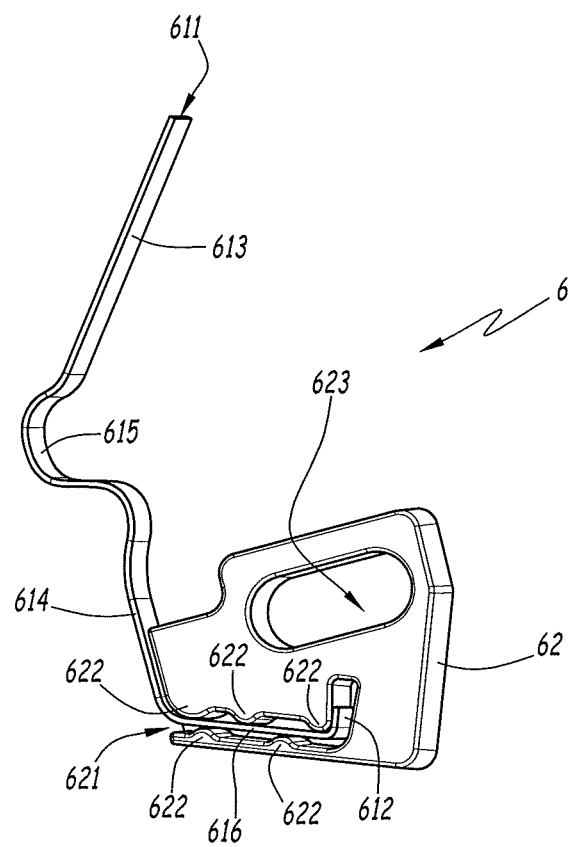

In embodiments that are illustrated in more detail in FIGS. 2, 5 and 6, the strip 61 has a free first end 611, a second end 612 fastened to the base 62, a first part 613 and a second part 614 that are connected together by a curved portion 615.

For example, the parts 613 and 614 are substantially straight and the curved portion 615 has a rounded U shape.

The strip 61 also has a third part 616, which is substantially straight and at an angle to the part 614. The third part 616 ends at the second end 612. The part 613 ends at the first end 611.

In the examples illustrated, the parts 613 and 614 extend in a vertical plane. The main faces of the strip extend perpendicularly to the wall 21.

In examples, the second end 612 of the strip has a bent portion.

In embodiments, the free end 611 bear against the bar when the bar is in the second position. It will thus be understood that the first end 611, or at the very least the portion of part 613 that is situated in the vicinity of the end 611, is positioned substantially at the location occupied by the bar 4 when the latter is in the second position.

Furthermore, the curved portion 615 is disposed next to the slot 22 and forms a space for retaining the bar 4 when the bar 4 is in the first position.

For example, as illustrated in FIGS. 3 and 4, the first part 613 extends along the slot 22. The first end 611 is positioned at the upper end of the slot 22 and the curved portion 615 is positioned at the lower end of the slot 22.

Preferably, the strip 61 is offset with respect to the movable part 51 of the sensor 5, for example offset along the axis X3, so as to avoid any overlap between the strip 61 and the movable part 21. The strip 61 and the movable part 51 are nevertheless close enough to the wall 21 to be actuated by the bar 4.

In examples, the strip 61 is kept in contact with the bar 4 when the bar 4 moves between the first position and the second position, for example by sliding along the strip 61, in contact with one of the main faces of the strip 61.

On account of its resilience, the strip 61 allows a travel that does not impede the movement of the bar 4 from the second position (high position, associated with the DINF threshold) to the first position (low position, associated with the DIN threshold).

When the bar 4 is in one or the other of the first and second positions, by virtue of the retaining force exerted by the strip 61 on the bar 4 on account of the resilience of the strip 61, the bar 4 is kept stably in position.

In order to move the bar 4 in order to transfer it to its other position, a force greater than the retaining force has to be exerted on the bar 4. In practice, the retaining force threshold is chosen to be high enough for parasitic vibrations inside the unit CB not to be sufficient to move the bar 4 out of its first or second position. On the other hand, a movement of the part 3 resulting from a corresponding movement of the shaft S is sufficient to overcome the retaining force and thus to move the bar 4 to its opposite position.

It will thus be understood that the stabilizing device 6 reduces the risk of undesired oscillations of the bar 4 when the bar 4 is in the first position. In this embodiment, the oscillations are reduced when the bar 4 is one or the other of the first and second positions. Such vibrations are, for example, caused by electrodynamic forces when the unit CB has a high current passing through it.

For example, when the bar 4 is in the first position, vibrations of the bar 4 could at least temporarily cause the strip 51 to be released, thereby causing the button 53 to be released, while the shaft S would not have changed position. The sensor 5 would then return erroneous information, which would not reflect the actual state of the unit CB. An inappropriate self-protection threshold would then be chosen that would compromise proper operation of the electrical installation.

By virtue of the invention, the stabilizing device 6 makes it possible to limit the inadvertent vibrations of the bar 4 that are likely to lead to erroneous detection of the state of the unit CB. The measuring device 1 thus makes it possible to safely and reliably determine whether the unit CB is in an open or closed state.

In embodiments, the base 62 is made of polymer, in particular plastic, for example by moulding.

Preferably, the base 62 is made of polycarbonate. Polycarbonate makes it possible to limit moisture uptake and therefore increases the durability of the base 62.

In embodiments, when the device 1 is in an assembled configuration, the sensor 5 is mounted on the armature 2 in a manner aligned with the base 62. The base 62 is interposed between the sensor 5 and the main wall 21.

This makes it possible in particular to limit the space requirement of the device 1.

For example, the base 62 has a substantially flat shape. The main walls of the base 62 are aligned parallel to the main wall 21. Preferably, the base 62 is kept in contact with the main wall 21.

In the examples illustrated, the sensor 5 and the stabilizing device 6 are mounted on the second face of the main wall 21.

Advantageously, the thickness e62 of the base 62, measured in a direction along the axis X3 when the device 1 is in the assembled configuration, is less than or equal to 5 mm or, preferably, less than or equal to 3.35 mm.

In examples, the sensor 5 and the device 6 are installed in a receiving zone delimited by electrically insulating protective walls 23, 34 that protrude perpendicularly from the main wall 21.

For example, the protective walls 23 and 24 make it possible to increase the distance of the leakage paths into air for a leakage current inside the device 1. The risk of a user being electrocuted by a leakage current travelling along the connection between the connector 54 and the control unit of the unit CB is thus reduced.

By way of example, the sensor 5 and the device 6 are mounted by being fitted on fastening pegs 25 and being kept in position by one or more fastening elements 26 such as hooks. For example, the fastening pegs 25 and the elements 26 are part of the armature 2 and extend parallel to the axis X3.

The base 62 has a through-orifice 623, through which the fastening pegs 25 pass. The hooks 26 engage with the edges of the body 52 of the sensor 5 in order to keep it pressed against the base 62 of the device 6.

This makes it possible to keep the base 62 stably in position so as not to generate additional vibrations. This also makes it possible to limit the space requirement of the device 1.

Additional embodiments of the device 6 will now be described more particularly with reference to FIGS. 5 and 6.

In examples, the base 62 has a receiving housing 621 inside which one end of the strip 61 is received. Thus, the strip 61 is embedded in the base 62 by being at least partially received in the housing 621.

In the example illustrated, the part 616 and the end 612 are received in the housing 621. The housing 621, in this case in the form of a cavity, has a shape complementary to the received portion of strip 61, for example an L shape. The bent portion of the second end 612 forms a stop that prevents the strip 61 from being removed from the housing 621 by being moved in longitudinal translation.

For example, the strip 61 is anchored by means of bearing points 622 that protrude into the housing 621 from the base 62. The bearing points 622 are in contact with the portion 616. For example, there is at least one bearing point 622 on either side of the portion 616. There are five bearing points 622 in this case.

In examples, the housing 621 is open onto a first face of the base 62, this first face facing the main wall 21. The strip 61 can thus be inserted easily into the housing 621 during the assembly of the device 1. In the assembled configuration of the device 1, the opening in the housing 621 is closed by the wall 21 with which the device 6 is in contact, thereby preventing the strip 61 from escaping from the housing 621.

Advantageously, the base 62 has an overthickness 624 formed on a second face of the base 62, next to the housing 621. The second face of the base 62 is on the opposite side from the first face of the base 62. By virtue of the overthickness 624, the walls of the base 62 are thick enough for the base 62 to be able to be demoulded easily when it is manufactured by moulding.

In examples, the base 62 has an electrically insulating protective wall 625 that protrudes from the second face of the base 62.

The protective wall 625 in this case extends perpendicularly to the wall 21 when the device 1 is in an assembled configuration. For example, the wall 625 is parallel to the wall 24 when the device 1 is in an assembled configuration. The wall 625 is in this case produced in one piece with the base 62.

The length of the protective wall 625, measured along the axis X3, is denoted "l625". The length l625 is, for example, greater than or equal to 1 cm or greater than or equal to 2 cm. The length l625 is, for example, less than or equal to 10 cm or less than or equal to 5 cm.

The protective wall 625 makes it possible to increase the distance of the leakage paths into air inside the device 1. The risk of a user being electrocuted by leakage currents is thus reduced.

The embodiments and variants envisaged above can be combined with one another to give rise to new embodiments.

The invention claimed is:

1. A measuring device for detecting the state of an electrical switching unit, wherein said measuring device comprises:
    an armature comprising a main wall;
    a rotary part configured to be mechanically coupled to a control shaft of an electrical switching unit;
    a bar that is able to rotate, integrally with the rotary part, between a first position and a second position, the bar extending through a slot formed in the main wall;
    a position sensor having a movable contact designed to be pushed into a retracted position by the bar when the bar is in the first position and into a released position when the bar is in the second position;
    a stabilizing device having a base integral with the armature and a resilient strip fastened to the base, the strip extending along the slot and being designed to exert a retaining force on the bar when it is in the first position.

2. The device according to claim 1, wherein the strip has a curved portion that is disposed next to the slot and forms a space for retaining the bar when the bar is in the first position.

3. The device according to claim 1, wherein the base is made of polycarbonate.

4. The device according to claim 1, wherein the base has a receiving housing inside which a portion of the strip is received, the housing being open onto a first face of the base that faces the main wall of the armature, the strip being anchored with bearing points protruding into the housing from the base.

5. The device according to claim 4, wherein the embedded end of the strip has a bent portion.

6. The device according to claim 4, wherein the base has an overthickness formed next to the receiving housing on a second face of the base on the opposite side from the first face.

7. The device according to claim 1, wherein the base has an electrically insulating protective wall protruding from the base perpendicularly to the main wall of the armature.

8. The device according to claim 1, wherein the position sensor is mounted on the armature in a manner aligned with the base of the stabilizing device, the base being interposed between the position sensor and the main wall.

9. The device according to claim 1, wherein the strip has a free end portion that is disposed next to the slot and bears against the bar when the bar is in the second position.

10. The device according to claim 1, wherein the strip is kept in contact with the bar when the bar moves between the first position and the second position.

11. The device according to claim 1, wherein the strip is designed to exert a retaining force on the bar when the bar is in the second position.

12. An electrical switching unit having separable electrical contacts, the unit having a control shaft coupled to the separable electrical contacts in order to switch the unit between an electrically open state and an electrically closed state, wherein the switching unit also has a measuring device according to claim 1, the measuring device being mechanically coupled to the control shaft in order to detect whether the unit is in the open state or in the closed state.

* * * * *